US008955800B2

(12) United States Patent
McGeer et al.

(10) Patent No.: US 8,955,800 B2
(45) Date of Patent: Feb. 17, 2015

(54) METHOD AND APPARATUS FOR AUTOMATED LAUNCH, RETRIEVAL, AND SERVICING OF A HOVERING AIRCRAFT

(75) Inventors: Brian T. McGeer, Underwood, WA (US); Robert S. Coatney, White Salmon, WA (US)

(73) Assignee: Aerovel Corporation, White Salmon, WA (US)

( * ) Notice: Subject to any disclaimer, the term of this patent is extended or adjusted under 35 U.S.C. 154(b) by 276 days.

(21) Appl. No.: 13/527,177

(22) Filed: Jun. 19, 2012

(65) Prior Publication Data

US 2013/0161447 A1 Jun. 27, 2013

Related U.S. Application Data

(60) Provisional application No. 61/502,566, filed on Jun. 29, 2011.

(51) Int. Cl.
*B64F 1/02* (2006.01)
*B64F 1/04* (2006.01)
(Continued)

(52) U.S. Cl.
CPC ................. *B64F 1/02* (2013.01); *B64C 39/024* (2013.01); *B64F 1/04* (2013.01); *B64F 1/22* (2013.01); *B64C 2201/088* (2013.01); *B64C 2201/108* (2013.01); *B64C 2201/182* (2013.01)
USPC ....... 244/110 E; 244/63; 244/110 F; 244/116

(58) Field of Classification Search
USPC ............. 244/63, 110 R, 110 C, 110 E, 110 F, 244/110 G, 114 R
See application file for complete search history.

(56) References Cited

U.S. PATENT DOCUMENTS

| 1,144,505 A | 6/1915 | Steffan |
| 1,306,860 A | 6/1919 | Smith |

(Continued)

FOREIGN PATENT DOCUMENTS

| CA | 781808 | 4/1968 |
| CA | 839101 | 4/1970 |

(Continued)

OTHER PUBLICATIONS

Skyhook (Harrier handling system); Harpoon Head Quarters; available at http://www.harpoondatabases.com/encyclopedia/Entry2979.aspx; printed Jun. 21, 2013 (3 pages).

(Continued)

*Primary Examiner* — Joseph W Sanderson
(74) *Attorney, Agent, or Firm* — Neal Gerber & Eisenberg LLP

(57) ABSTRACT

An aircraft capable of thrust-borne flight can be automatically retrieved, serviced, and launched using equipment suitable for a small vessel. For retrieval, the aircraft hovers over a base apparatus having one or more rails which bound a space into which the aircraft can safely descend. When the aircraft's measured position and velocity are appropriate, the aircraft descends promptly such that a spanwise component on the aircraft engages the rails. The teeth restrain the aircraft in position and orientation, while the rails bring the aircraft to rest. Articulation of the rails is used to park the aircraft in a servicing station. Connections for refueling, recharging, and/or functional checks are made in preparation for launch. Launch is effected by removing connections and restraints and articulating the rails to put the aircraft in an appropriate position and orientation. The aircraft uses its own thrust to climb out of the apparatus into free flight.

20 Claims, 14 Drawing Sheets

(51) Int. Cl.
*B64F 1/22* (2006.01)
*B64C 39/02* (2006.01)

(56) References Cited

U.S. PATENT DOCUMENTS

| | | | |
|---|---|---|---|
| 1,383,595 A | 7/1921 | Black | |
| 1,499,472 A | 7/1924 | Pratt | |
| 1,582,188 A * | 4/1926 | Mummert | 244/110 R |
| 1,625,020 A * | 4/1927 | Diago | 244/63 |
| 1,686,298 A * | 10/1928 | Uhl | 244/63 |
| 1,716,670 A | 6/1929 | Sperry | |
| 1,731,091 A | 10/1929 | Clayton | |
| 1,748,663 A | 2/1930 | Tucker | |
| 1,836,010 A | 12/1931 | Audrain | |
| 1,848,828 A * | 3/1932 | Griffin | 244/116 |
| 1,912,723 A * | 6/1933 | Perkins | 244/63 |
| 2,415,071 A * | 2/1947 | Brie | 244/115 |
| 2,435,197 A | 2/1948 | Brodie | |
| 2,448,209 A | 8/1948 | Boyer et al. | |
| 2,488,050 A | 11/1949 | Brodie | |
| 2,488,051 A * | 11/1949 | Brodie | 244/110 F |
| 2,552,115 A | 5/1951 | Replogle | |
| 2,807,429 A * | 9/1957 | Hawkins, Jr. et al. | 244/114 R |
| 3,351,325 A | 11/1967 | Cotton | |
| 3,785,316 A * | 1/1974 | Leming et al. | 114/261 |
| 3,980,259 A | 9/1976 | Greenhalgh et al. | |
| 4,079,901 A * | 3/1978 | Mayhew et al. | 244/63 |
| 4,116,408 A * | 9/1978 | Soloy | 244/11 R |
| 4,123,020 A | 10/1978 | Korsak | |
| 4,147,317 A | 4/1979 | Mayhew et al. | |
| 4,311,290 A | 1/1982 | Koper | |
| 4,575,026 A * | 3/1986 | Brittain et al. | 244/63 |
| 4,680,962 A | 7/1987 | Durbin | |
| 4,753,400 A | 6/1988 | Reuter et al. | |
| 4,790,497 A | 12/1988 | Yoffe | |
| 4,842,222 A | 6/1989 | Baird | |
| 5,039,034 A | 8/1991 | Burgess et al. | |
| 5,042,750 A | 8/1991 | Winter | |
| 5,054,717 A | 10/1991 | Taylor | |
| 5,092,540 A | 3/1992 | Burgess et al. | |
| 5,687,930 A | 11/1997 | Wagner et al. | |
| 5,799,900 A | 9/1998 | McDonnell | |
| 5,806,795 A * | 9/1998 | Ortelli | 244/116 |
| 6,264,140 B1 | 7/2001 | McGeer et al. | |
| 6,824,102 B2 | 11/2004 | Haggard | |
| 6,874,729 B1 | 4/2005 | McDonnell | |
| 6,961,018 B2 | 11/2005 | Heppe et al. | |
| 7,066,430 B2 | 6/2006 | Dennis et al. | |
| 7,097,137 B2 | 8/2006 | McDonnell | |
| 7,104,495 B2 | 9/2006 | McGeer | |
| 7,121,507 B2 | 10/2006 | Dennis et al. | |
| 7,140,575 B2 | 11/2006 | McGeer et al. | |
| 7,143,974 B2 | 12/2006 | Roeseler et al. | |
| 7,143,976 B2 | 12/2006 | Snediker et al. | |
| 7,152,827 B2 | 12/2006 | McGeer | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,264,204 B1 | 9/2007 | Portmann | |
| 7,344,108 B2 | 3/2008 | Muylaert et al. | |
| 7,360,741 B2 | 4/2008 | McGeer et al. | |
| 7,410,125 B2 | 8/2008 | Steele | |
| 7,510,145 B2 | 3/2009 | Snediker | |
| 7,665,691 B2 | 2/2010 | Hanzlick et al. | |
| 7,712,702 B2 | 5/2010 | McGeer et al. | |
| 968,339 A1 | 8/2010 | Geraldson | |
| 7,954,758 B2 | 6/2011 | McGeer et al. | |
| 8,245,968 B2 | 8/2012 | Mcgeer et al. | |
| 8,276,844 B2 | 10/2012 | Kariv | |
| 8,348,193 B2 | 1/2013 | Mcgeer et al. | |
| 8,464,981 B2 | 6/2013 | Goldie et al. | |
| 2002/0100838 A1 | 8/2002 | McGeer et al. | |
| 2003/0222173 A1 | 12/2003 | McGeer et al. | |
| 2004/0256519 A1 | 12/2004 | Ellis et al. | |
| 2005/0133665 A1 | 6/2005 | Dennis et al. | |
| 2005/0151014 A1 | 7/2005 | McGeer | |
| 2005/0178894 A1 | 8/2005 | McGeer et al. | |
| 2005/0178895 A1 | 8/2005 | McGeer et al. | |
| 2005/0189450 A1 | 9/2005 | Roeseler et al. | |
| 2005/0230536 A1 | 10/2005 | Dennis et al. | |
| 2006/0065780 A1 | 3/2006 | Rednikov | |
| 2006/0102783 A1 | 5/2006 | Dennis et al. | |
| 2006/0175463 A1 | 8/2006 | McGeer | |
| 2006/0175466 A1 | 8/2006 | Snediker et al. | |
| 2006/0249623 A1 | 11/2006 | Steele | |
| 2007/0051849 A1 | 3/2007 | Watts et al. | |
| 2007/0075185 A1 | 4/2007 | McGeer et al. | |
| 2007/0084965 A1 * | 4/2007 | Lipponen | 244/63 |
| 2007/0158498 A1 | 7/2007 | Snediker | |
| 2007/0215752 A1 * | 9/2007 | Steinkerchner et al. | 244/116 |
| 2007/0252034 A1 | 11/2007 | McGeer et al. | |
| 2008/0156932 A1 | 7/2008 | McGeer et al. | |
| 2009/0224097 A1 | 9/2009 | Kariv | |
| 2011/0024559 A1 | 2/2011 | McGeer et al. | |
| 2011/0133024 A1 | 6/2011 | McGeer et al. | |
| 2011/0233329 A1 | 9/2011 | McGeer et al. | |
| 2012/0187243 A1 * | 7/2012 | Goldie et al. | 244/110 |
| 2012/0273612 A1 | 11/2012 | McGeer et al. | |
| 2013/0082137 A1 * | 4/2013 | Gundlach et al. | 244/110 |

FOREIGN PATENT DOCUMENTS

| | | | |
|---|---|---|---|
| EP | 0 472 613 | 4/1992 | |
| GB | 2071031 A * | 9/1981 | B64F 1/04 |
| WO | WO 01/07318 | 2/2001 | |
| WO | 2008/015663 | 2/2008 | |

OTHER PUBLICATIONS

A miniature powerplant for very small, very long range autonomous aircraft, S.P. Hendrickson and T. McGeer, Final Report under U.S. DoE contract No. DE-FG03-96ER82187, Sep. 29, 1999 (25 pages).
Aerosonde hazard estimation, T. McGeer, 1994 (7 pages).
Aerosonde Pacific reconnaissance: ready when you are!, T. McGeer, Pacific Northwest Weather Workshop, Mar. 2005 (15 pages).
An Airspeed Vector Sensor for V/STOL Aircraft, E. Durbin and T. McGeer, Journal of Aircraft, vol. 19, No. 6, Jun. 1982 (7 pages).
Autonomous Aerosondes for Economical Atmospheric Soundings Anywhere on the Globe, G.J. Holland, T. McGeer and H.H. Youngren, Bulletin of the American Meteorological Society, vol. 73, No. 12, Dec. 1992 (12 pages).
Automated Launch, Recovery, and Refueling for Small Unmanned Aerial Vehicles, K. Mullens, et al., 2004 (11 pages).
International Search Report (PCT/US2007/076276), dated Sep. 22, 2008 (7 pages).
Laima: The First Atlantic Crossing by Unmanned Aircraft, T. McGeer, Feb. 25, 1999 (25 pages).
Quantitative Risk Management as a Regulatory Approach to Civil UAVs, T. McGeer, L. Newcombe, and J. Vagners, International Workshop on UAV Certification, Jun. 4, 1999 (11 pages).
Regulatory Issues Involving Long-Range Weather Observation by Aerosonde Autonomous Aircraft, T. McGeer, Oct. 9, 1998 (8 pages).
Safety, Economy, Reliability and Regulatory Policy for Unmanned Aircraft, T. McGeer, Mar. 2007 (9 pages).
The Beartrap—A Canadian Invention, Crowsnest Magazine, vol. 17, Nos. 3 and 4 [online], Mar.-Apr. 1965, [retrieved on Sep. 14, 2007]. Retrieved from the Internet at <URL: http://www.readyayeready.comftimelinef1960s/beartrapfindex.htm> (4 pages).
Wide-Scale Use of Long-Range Miniature Aerosondes Over the World's Oceans, T. McGeer and J. Vagners, 1999 (25 pages).
Written Opinion (PCT/US2007/076276), dated Mar. 5, 2009 (6 pages).
Examiner's First Report for Australian Patent Application No. 2007347147, dated Oct. 26, 2011 (2 pages).
Flexrotor Long-Endurance VTOL Aircraft Transitions to Wing-Borne Flight, Aug. 4, 2011 (2 pages).
European Search Report for European Patent Application No. 10250229.1, dated Jan. 21, 2013 (5 pages).
Mini-RPV Recovery System Conceptual Study, Prepared for Eustis Directorate U.S. Army Air Mobility Research and Development Laboratory, Aug. 1977 (322 pages).

* cited by examiner

METHOD AND APPARATUS FOR AUTOMATED LAUNCH, RETRIEVAL, AND SERVICING OF A HOVERING AIRCRAFT

PRIORITY

This application is a non-provisional of, and claims priority to and the benefit of, U.S. Provisional Patent Application No. 61/502,566, filed on Jun. 29, 2011, the entire contents of which are incorporated herein by reference.

BACKGROUND

1. Field

The present disclosure is directed to launch, retrieval, and servicing of a hovering aircraft, especially in turbulent winds or onto an irregularly-moving platform, such as a ship in a rough sea. The present disclosure is especially suited to unmanned aircraft of a small size. It allows for a fully automated operations cycle, whereby the aircraft can be repeatedly launched, retrieved, serviced, and re-launched, without manual intervention at any point, and while requiring only modest accuracy in piloting.

2. Description of Prior Art

Hovering aircraft, be they helicopters, thrust-vectoring jets, "tail-sitters", or other types, usually land by gently descending in free thrust-borne flight onto a landing surface, coming to rest on an undercarriage of wheels, skids, or legs. This elementary technique can be problematic in certain situations, as for example when targeting a small, windswept landing pad on a ship moving in a rough sea. The well-known Beartrap or RAST (Stewart & Baekken 1968) as well as the harpoon-and-grid system (Wolters & Reimering 1994) are used by helicopters to permit retrieval with acceptable safety in such conditions. These systems require an expensive and substantial plant in the landing area, as well as manual operations coordinated between helicopter and shipboard crew. Furthermore, the helicopter must carry a complete undercarriage in addition to the components necessary for capturing the retrieval apparatus.

Desirable improvements relative to such existing systems include: (a) simplification of base and onboard apparatus, and (b) automated rather than manual operation. Ideally, automation would encompass not only retrieval but also subsequent servicing and launch. This would be particularly desirable for an unmanned aircraft, whose operations cycle could then be made fully autonomous. Some experimental work toward this objective has been done for a hovering aircraft by Mullens et al. (2004), but with limited success even with light wind and a stationary base. McGeer and von Flotow (2010) and McGeer et al. (2010) have disclosed techniques which by contrast provide for fully automated retrieval and turnaround in calm or rough conditions. These techniques involve a tether lowered from the aircraft to be retrieved. The present disclosure similarly provides for fully automated handling in calm or rough conditions, but does not require a tether. The associated apparatus is simple, portable, and suitable for a small vessel or similarly confined base.

SUMMARY

An aircraft capable of thrust-borne flight can be automatically retrieved, serviced, and launched using equipment suitable for a small vessel, or on land with similarly limited space or irregular motion. For retrieval, the aircraft hovers over a base apparatus having one or more rails which bound a space into which the aircraft can safely descend. The aircraft is capable of stationkeeping approximately and navigating accurately relative to this target space. When the aircraft's measured position and velocity are appropriate, the aircraft descends promptly, or the rails promptly rise, such that a wing or other spanwise component on the aircraft engages teeth or like restraints on the rails. The teeth restrain the aircraft in position and orientation, and the rails bring the aircraft to rest while complying sufficiently to prevent overstressing the aircraft or base apparatus. Aircraft position and orientation are thereafter controlled by articulation of the rails, which is used to park the aircraft precisely in an aircraft servicing station. Connections for refueling and recharging are made, and for functional checks in preparation for launch. Additional restraints may be applied in the servicing station to allow engine testing while preventing motion of the aircraft. Launch is effected by removing connections and restraints, and then articulating the rails to put the aircraft in an appropriate position and orientation. The aircraft then uses its own thrust to climb out of the apparatus into free flight. A full ground-handling cycle can thus be accomplished automatically with a simple and economical apparatus. It can be used with low risk of damage, and requires only moderate accuracy in manual or automatic flight control.

DETAILED DESCRIPTION

In one embodiment of the present disclosure, an aircraft would proceed automatically from free thrust-borne flight through retrieval, servicing, and subsequent launch via the sequence of actions generally shown in FIGS. 1, 2, 3, 4, 5, 6, 7, 8, and 9.

Figure 1:
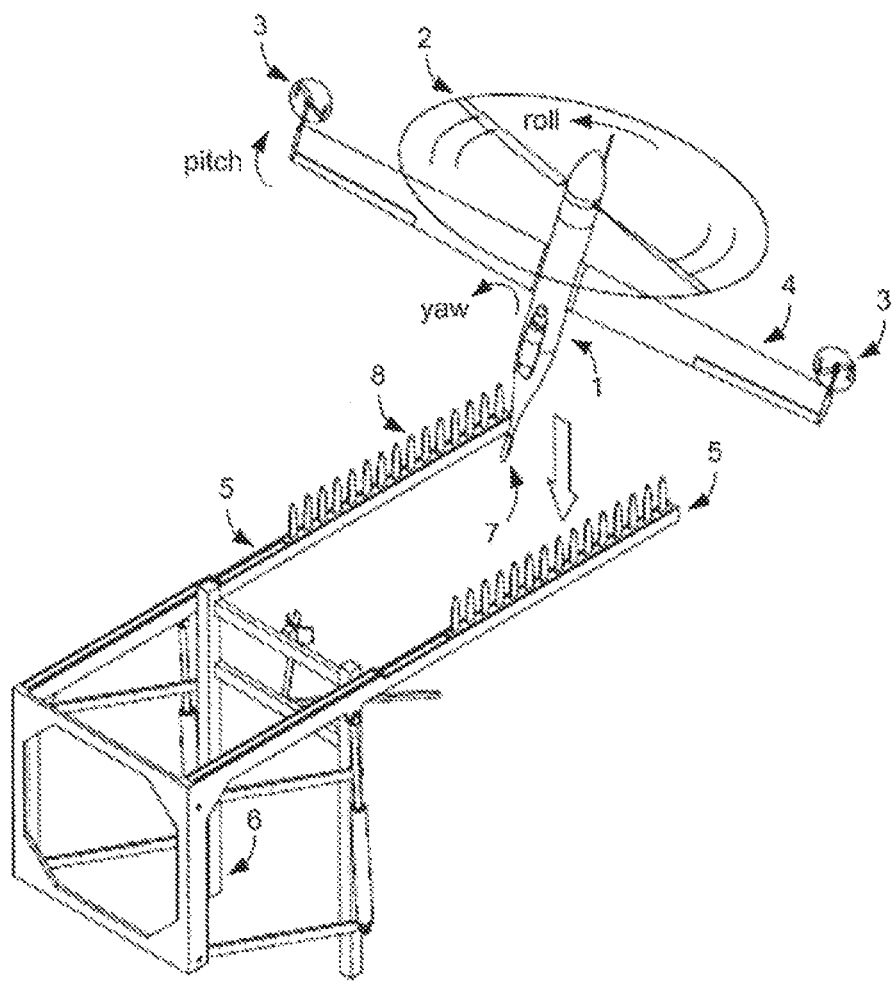
FIGS. 1, 2, 3, 4, 5, 6, 7, 8, and 9 illustrate the retrieval of an aircraft from free thrust-borne flight by one embodiment of the apparatus of the present disclosure, servicing of the aircraft by the apparatus, and subsequent launch of the aircraft.

FIG. 1 shows the aircraft 1 hovering above the base apparatus 6. The aircraft 1 in this example is supported by a main rotor 2, which controls pitch and yaw with rotor cyclic as in a conventional helicopter. Control in roll, (i.e., about the spin axis of the rotor) is effected by thrusters 3 at the tips of the aircraft's wing 4. The wing 4 serves during launch and retrieval to engage rails 5 extending from the base apparatus 6 as further discussed below.

In preparation for retrieval, the aircraft 1 attempts to center itself above the rails 5. Winds and base motion may prevent the aircraft 1 from stationkeeping continuously. However, the aircraft 1 is able to measure position and velocity relative to the base apparatus 6, for example by differential satellite navigation, with accuracy sufficient to determine when the aircraft 1 can descend such that: (a) components below the wing 4, such as the rear fuselage 7, will pass between the rails; and (b) the aircraft's wing 4 will engage restrainers, such as teeth 8, on each rail. The base apparatus offers a large target, in that the aircraft can descend with success anywhere in the area or space approximately bounded in one direction by the spacing between the rails, and in the other direction by the length of each row of teeth. When an opportunity to descend within this area is recognized, the aircraft and rails are promptly brought into contact by a combination of aircraft descent and lifting of the rails.

Figure 2:
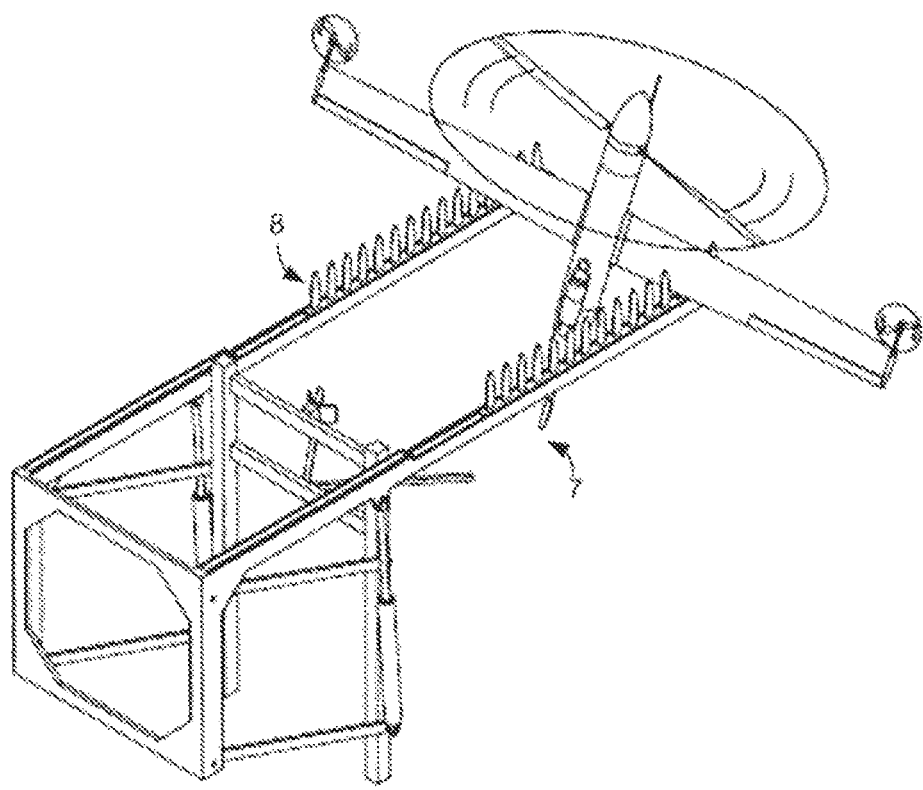
Figure 3:
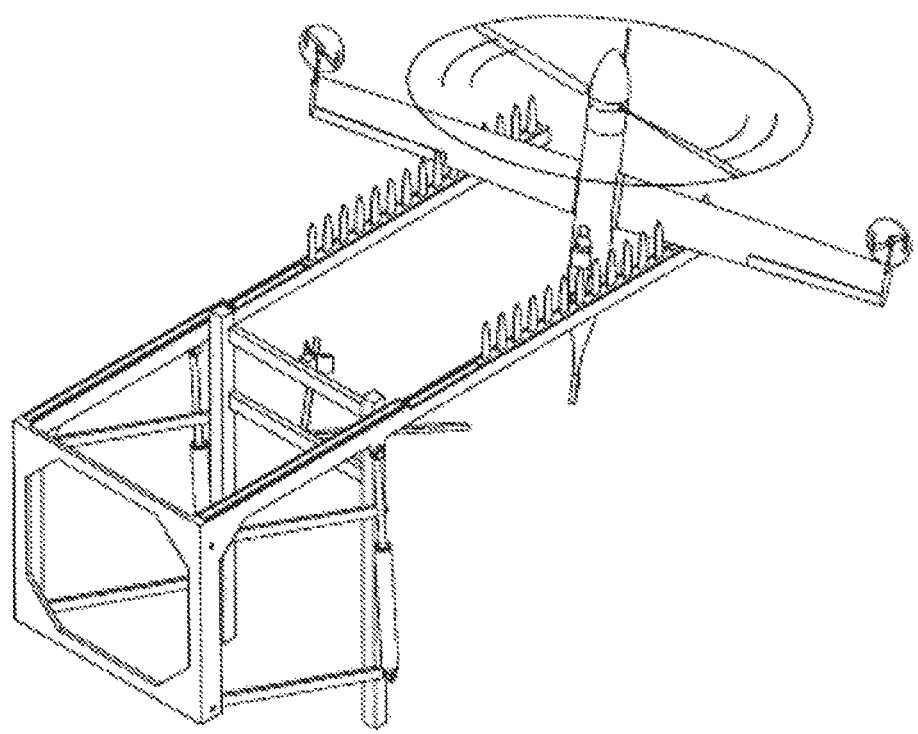

The situation shortly thereafter is illustrated in FIG. 2, which shows the aircraft 1 as the aircraft first contacts the base apparatus 6 and particularly the rails 5. At this point, the aircraft will in general be offset from the midline between the rails, and have a skewed orientation (i.e., the fuselage will be tilted from the vertical, and the wing will be neither horizontal nor normal to the rails). As the wing 4 falls further into the position shown in FIG. 3, entry between the teeth enforces orientation in pitch. The spinning rotor is thereby kept from making contact with the base apparatus.

Figure 4:
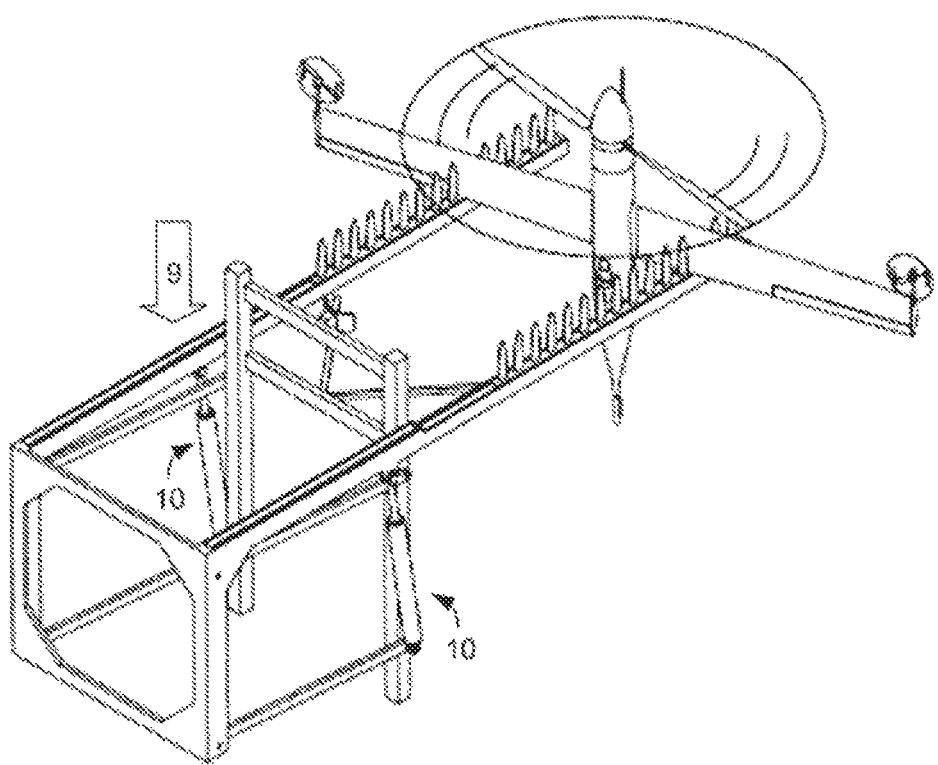

As the aircraft continues downward relative to the rails, contact with the rails aligns the wing in yaw and begins to brake the fall. Loads on the aircraft are kept within acceptable limits by one or more appropriate brakes, cushioning mechanisms, or impact absorbers, which may include combinations of soft material between the teeth; bending of the rails; and, as shown in FIG. 4, vertical articulation 9 of the rails (relative to the frame of the base apparatus) damped by shock absorbers 10. The aircraft is thus gently but firmly brought to rest. The rest state can be detected automatically by sensors on the aircraft or base apparatus, and the rotor and thrusters then stopped.

If instead the aircraft should miss one or both rails, then the aircraft will fall below the rails or develop excessive yaw. In either case, the aircraft can apply power, exit the base apparatus, and return for another approach.

Figure 5:
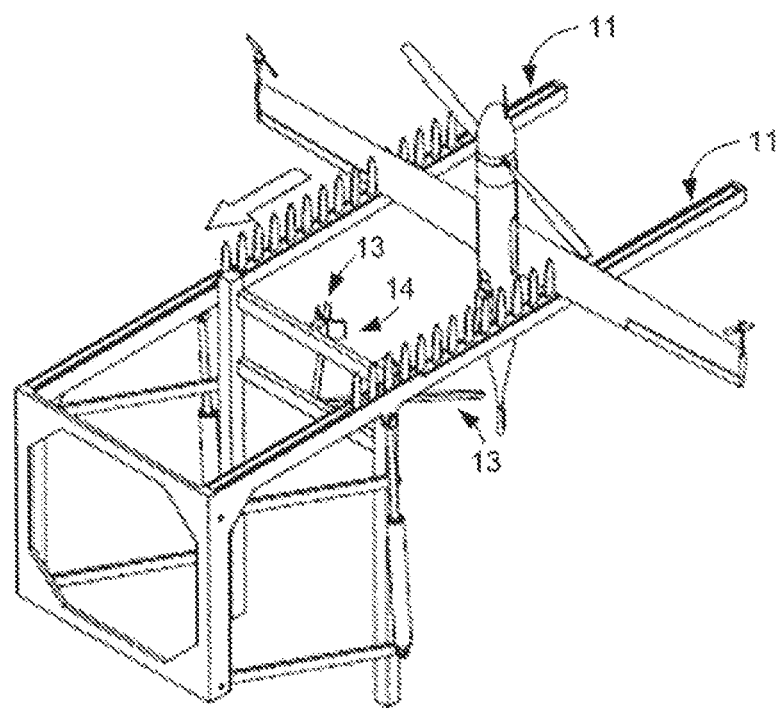

After being brought to rest by the teeth and rails, the aircraft is moved lengthwise along the rails, as shown in FIG. 5, toward a parking or servicing station 14. Translation can be effected, for example, by sliding the teeth in guides 11. Differential sliding of the teeth between the left and right rails is meanwhile used to align the aircraft in roll, so that its wing is normal to the rails. As the aircraft approaches the aircraft servicing station, the aircraft is moved to the midline between the rails, for example by guides 13 contacting its rear fuselage.

Figure 6:
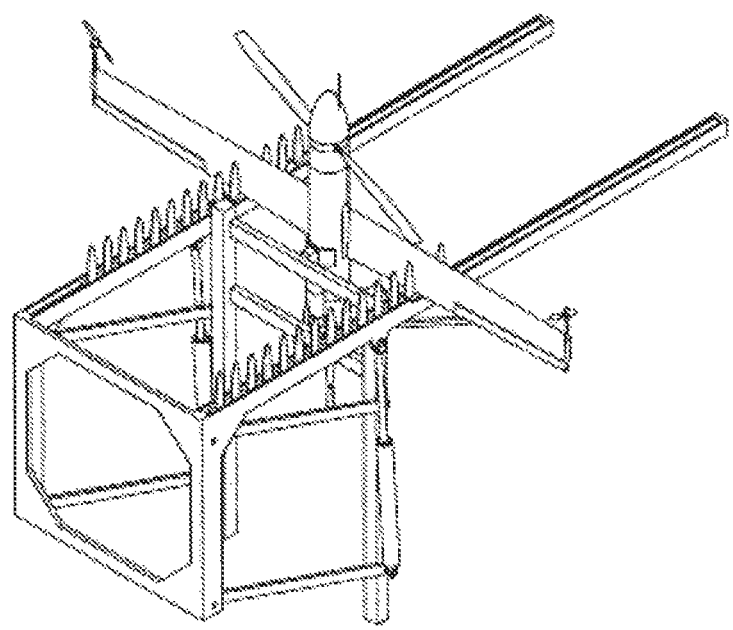

Continued translation along the rails thus docks the aircraft precisely in the servicing station, as shown in FIG. 6. Servicing connections for fuel, electrical power, etc. can be made as the aircraft is being pushed into the aircraft servicing station, or by appropriate actuators (not shown) after the aircraft has been parked. The aircraft can then automatically be recharged and de-fueled or refueled in preparation for launch.

The method and apparatus of the present disclosure thus bring the aircraft from an imprecise and irregular hover into a secure and well-controlled rest state. The simplicity and tolerance of imprecision provided by the present disclosure makes it particularly suited for use under practical conditions including, for example, aboard a small boat in a rough sea.

Figure 7:
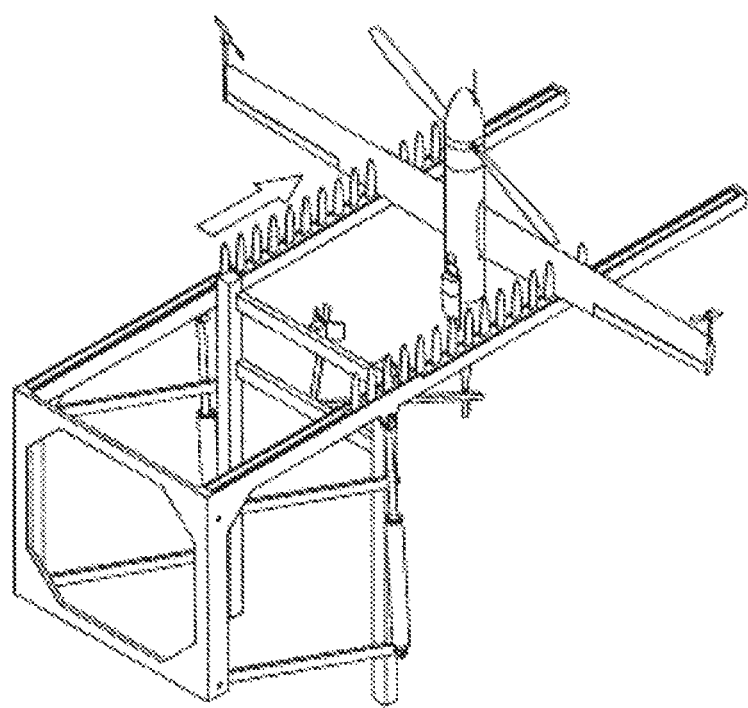
Figure 8:
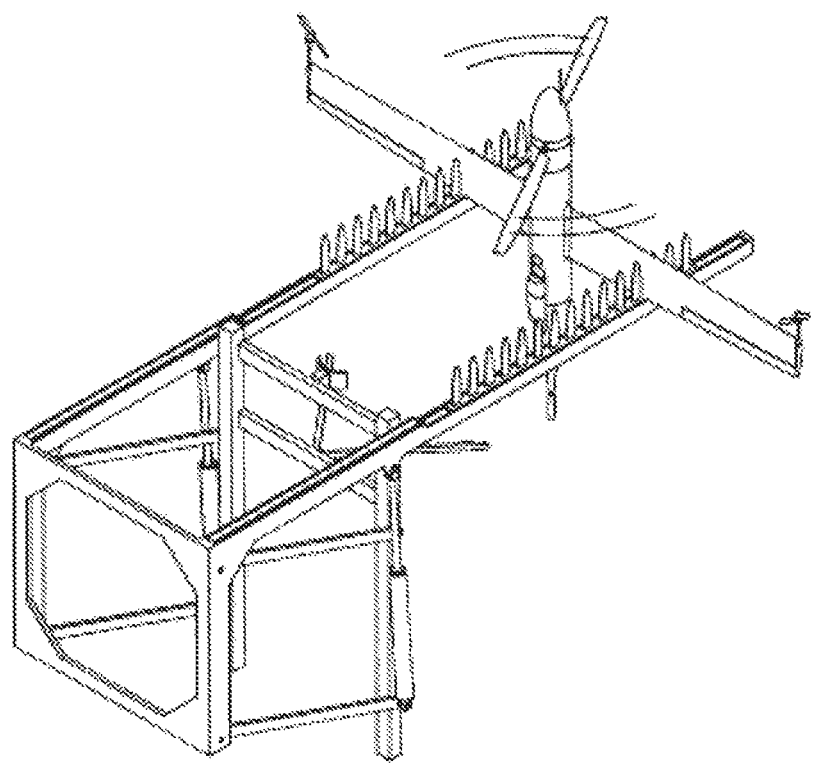

The next step after servicing is launch. In one embodiment, this is done simply by the aircraft starting its engine and climbing vertically out of the aircraft servicing station, with connections opened prior to or during exit. However, in order to minimize risk of fouling, it will often be preferable to increase clearance between the aircraft and the servicing station before climbout. Thus, FIG. 7 shows launch preparation beginning with the teeth drawing the aircraft toward the free ends of the rails. The aircraft in this case uses an onboard starter to spin up its engine after clearing the servicing station, as shown in FIG. 8. Alternatively, an external starter could be used before leaving the aircraft servicing station. This would allow automated pre-flight checks to be done at full thrust while the aircraft remained securely docked.

Figure 9:
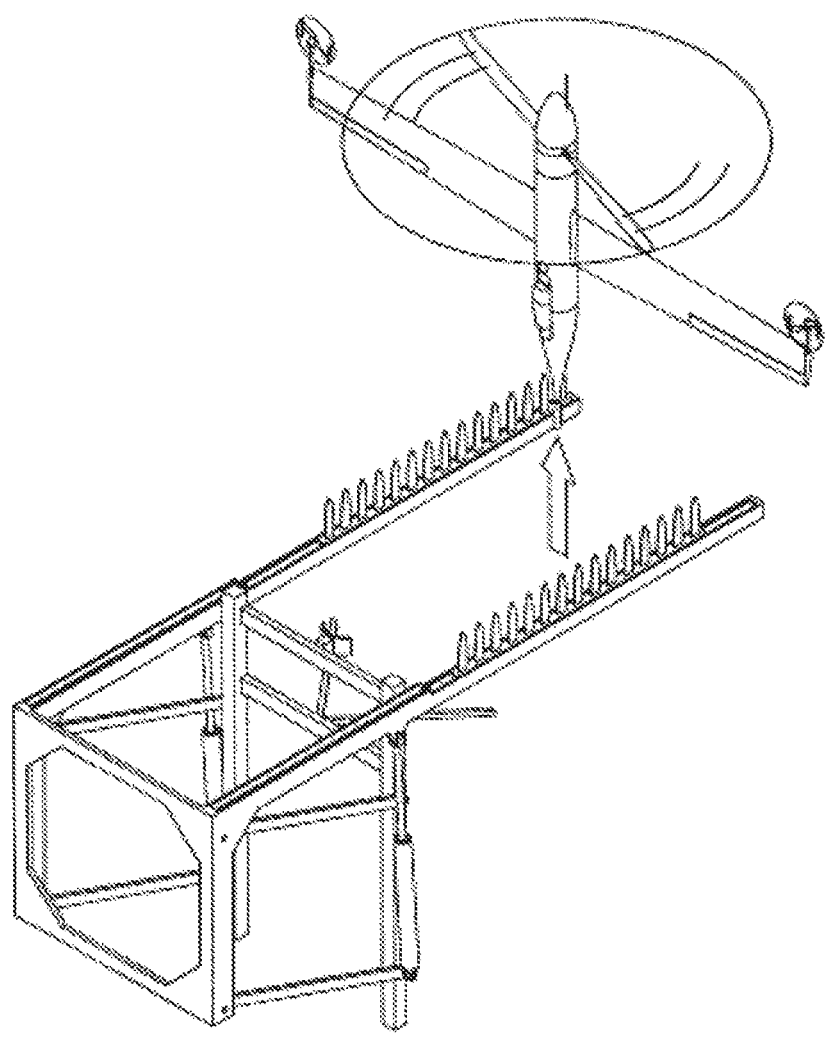

Once pre-flight checks are completed satisfactorily, the aircraft climbs clear of the rails into free flight, as shown in FIG. 9. The aircraft can then proceed on its mission, and ultimately return to the base apparatus for another retrieval. The full operations cycle of the aircraft can thus be performed without manual intervention.

It should be appreciated that in various embodiments, the apparatus of the present disclosure includes a base having: (a) a frame configured to rest on the ground or a moving object, such as a vessel on land or on water; (b) one or a plurality of rails supported by the frame and extending transversely from the frame; (c) upwardly extending restrainers such as spaced-apart teeth or pins on the rails; (d) a brake, cushioning mechanisms, and/or impact absorbers such as shock absorbers supported by the frame and attached to the rails, or soft material on the restrainers; (e) a parking or servicing station supported by the frame and configured securely to park the aircraft for servicing; (f) a mover supported by the frame and configured to move the spanwise fixture with respect to the parking station; (g) an aircraft guider or guides configured to guide the aircraft during the relative motion between the spanwise fixture and the parking station, such that the aircraft is inserted into the aircraft parking station in a desired position and orientation; (h) an extractor configured to extract the aircraft from the parking station; (i) one or more connectors configured to make and open one or more connections for transfer of fluids or electricity between the apparatus and the parked aircraft; and/or (j) one or more sensors configured to detect the positions of the aircraft relative to the frame and/or the rail or rails.

It should be appreciated that in accordance with the present disclosure: (a) the frame can be formed in configurations other than those illustrated in FIGS. 1 to 9; (b) the rails can be linear as shown in FIGS. 1 to 9 or other suitable forms or configurations, such as an elliptical rail or a polygonal rail; (c) other suitable damping, braking, cushioning, and/or impact absorbers or absorbing mechanisms can be employed; (d) the restrainers can include any suitable teeth, pins or other projections on the rails which extend in a principally vertical orientation; and (e) the rails may be configured individually to move toward and away from the aircraft parking station.

FIGS. 10A, 10B, 10C, 10D, and 10E illustrate another embodiment of the apparatus of the present disclosure. In this embodiment, the base apparatus includes a substantially circular rail 105 in a substantially horizontal orientation and including a plurality of restrainers such as teeth 108.

Figure 10A:
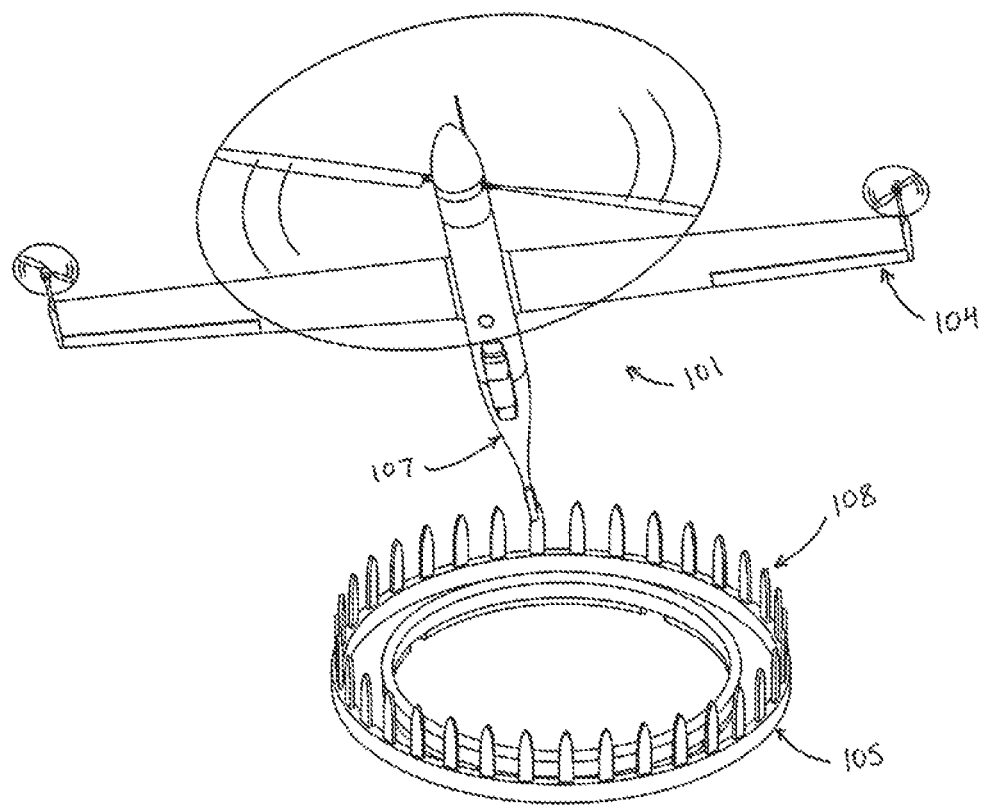
FIGS. 10A, 10B, 10C, 10D, and 10E illustrate the retrieval of an aircraft from free thrust-borne flight by another embodiment of the apparatus of the present disclosure.

In this embodiment, as shown in FIG. 10A, the aircraft 101 hovers above the space bounded by the rail and attempts to center itself above that bounded space. When it is determined that the aircraft can descend such that: (a) components below the wing 104, such as the rear fuselage 107, will pass through the bounded space; and (b) the aircraft's wing will engage the teeth, the aircraft and rails are promptly brought into contact by a combination of aircraft descent and lifting of the rail.

Figure 10B:
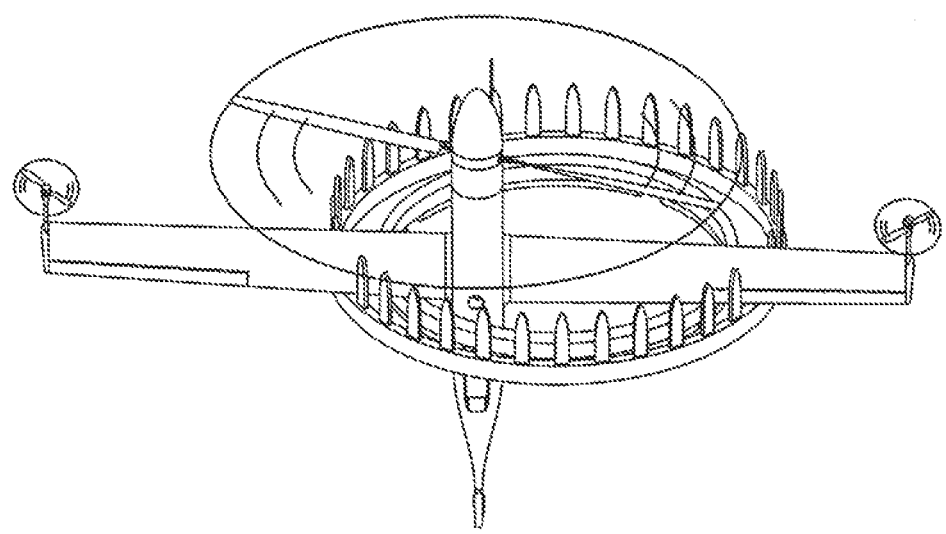

Shortly thereafter, as shown in FIG. 10B, the wing of the aircraft contacts the base apparatus. More specifically, the wing of the aircraft enters between the teeth of the base apparatus, thereby enforcing orientation in pitch and keeping the spinning rotor from making contact with the base apparatus. As the aircraft continues downward relative to the rail, contact with the rail aligns the wing in yaw and begins to brake the fall, eventually bringing the aircraft to rest. Appropriate brakes, cushioning mechanisms, or impact absorbers may be employed, as described above.

Figure 10C:
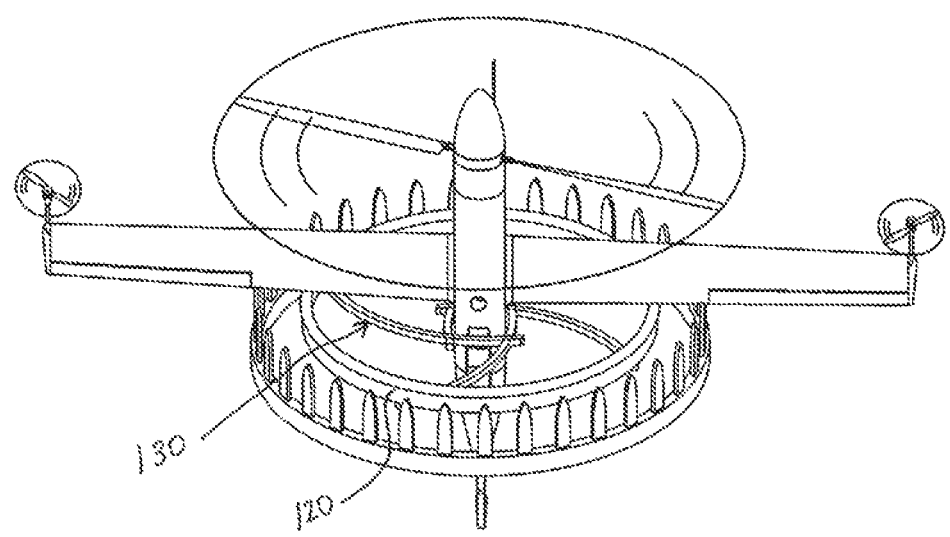

As shown in FIG. 10B, after being brought to rest, in certain instances the aircraft is not centered within the bounded space. In these instances, an aircraft lifting mechanism and aircraft centering arms are employed to center the aircraft within the bounded space. Specifically, as illustrated in FIG. 10C, the aircraft lifting mechanism 120 lifts the aircraft such that the wings are clear of (i.e., are no longer constrained by) the teeth, and the aircraft centering arms 130 center the aircraft within the bounded space by engaging and moving the fuselage of the aircraft to the desired position.

Figure 10D:
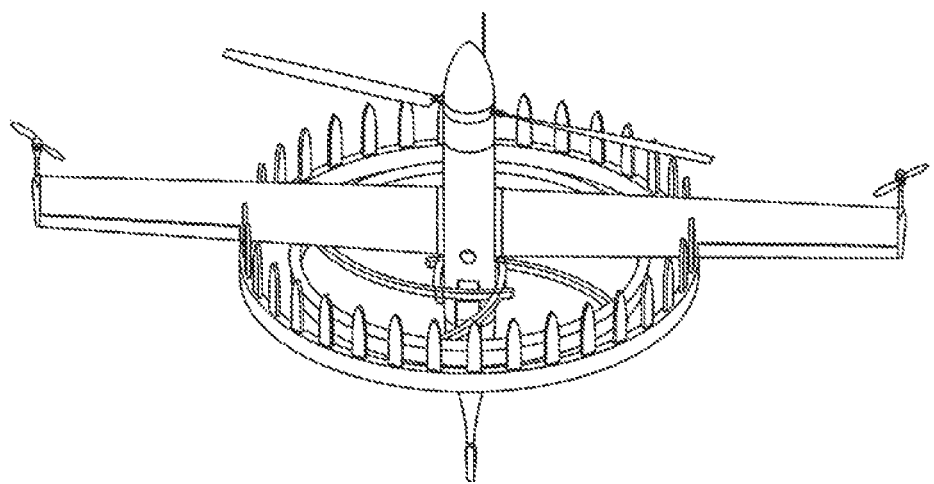
Figure 10E:
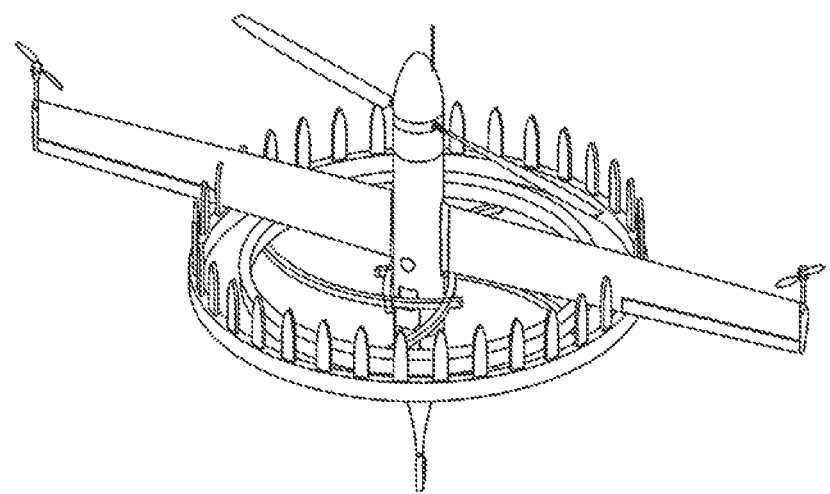

As shown in FIG. 10D, after centering the aircraft, the aircraft is held in the centered position by the aircraft centering arms, and the lifting mechanism lowers the aircraft such that the wing enters between the teeth and contacts the rail. Once in this centered resting state, the rotor and thrusters are stopped. As illustrated in FIG. 10E, when in this centered resting state, the rail may be rotated to orient the aircraft in a different way for subsequent launch.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus for retrieving an aircraft from free thrust-borne flight, the apparatus comprising:
   a frame;
   a parking station supported by the frame and including at least one arm configured to engage a portion of the aircraft;
   at least one rail connected to and extending from the frame; and
   a plurality of restrainers connected to the at least one rail, each restrainer being movable toward and away from the parking station, wherein at least two of the plurality of restrainers are positioned such that, when the at least one rail is oriented substantially horizontally: (i) a fixture on the aircraft can be received therebetween; and (ii) after the fixture on the aircraft is received therebetween, the aircraft is restrained in translation and rotation.

2. The apparatus of claim 1, wherein when the at least one rail is oriented substantially horizontally, the at least one rail is movable substantially vertically.

3. The apparatus of claim 1, wherein the at least one rail includes a first substantially linear rail and a second substantially linear rail spaced apart from the first rail.

4. The apparatus of claim 1, wherein the at least one rail includes a curved rail.

5. The apparatus of claim 1, which includes at least one fluid connector configured to connect to the aircraft and facilitate the transfer of fluid from a fluid source to the aircraft.

6. The apparatus of claim 1, which includes an impact absorber configured to dampen receipt of the fixture on the aircraft between two of the plurality of restrainers.

7. The apparatus of claim 1, wherein the fixture includes a wing of the aircraft.

8. The apparatus of claim 1, wherein the plurality of restrainers include one or more teeth extending vertically from the at least one rail.

9. The apparatus of claim 1, which includes:
   (a) a mover configured to move the plurality of restrainers toward and away from the parking station; and
   (b) a guider configured to, when the mover is moving the plurality of restrainers toward the parking station, guide the aircraft such that the aircraft is inserted into the parking station in a desired position and orientation.

10. The apparatus of claim 1, wherein the frame, the parking station, the at least one rail, and the plurality of restrainers form a base apparatus.

11. The apparatus of claim 1, wherein the plurality of restrainers are each movable relative to the at least one rail.

12. A method for retrieving an aircraft from free thrust-borne flight, the method comprising:
   hovering the aircraft over a space at least partially bordered by at least one rail connected to and extending substantially horizontally from a frame of a base apparatus, the at least one rail including a plurality of restrainers each movable toward and away from the frame;
   measuring a three dimensional position of the aircraft relative to the space;
   when the measured three dimensional position of the aircraft relative to the space is such that the aircraft may descend such that two of the plurality of restrainers receive a fixture on the aircraft therebetween, bringing the fixture on the aircraft and at least one rail into contact such that said two of the plurality of restrainers receive the fixture on the aircraft therebetween by a combination of descent by the aircraft and lifting of the at least one rail;
   thereafter, moving the plurality of restrainers toward a parking station supported by the frame; and
   engaging a portion of the aircraft with at least one arm of the parking station.

13. The method of claim 12, which is performed automatically.

14. The method of claim 12, wherein the base apparatus is attached to a moving vehicle.

15. The method of claim 12, wherein moving the plurality of restrainers toward the parking station supported by the frame includes guiding the aircraft such that the aircraft is inserted into the parking station in a desired position and orientation.

16. The method of claim 15, which includes providing at least one of fluid and electricity after guiding the aircraft into the parking station.

17. The method of claim 12, wherein the two restrainers are configured to engage the fixture on the aircraft such that the aircraft is restrained in translation and rotation.

18. The method of claim 17, wherein the plurality of restrainers include one or more teeth extending substantially vertically from the at least one rail.

19. The method of claim 12, wherein the plurality of restrainers are each movable relative to the at least one rail and moving the plurality of restrainers toward the parking station supported by the frame includes moving the plurality of restrainers relative to the at least one rail toward the parking station supported by the frame.

20. An apparatus for retrieving an aircraft from free thrust-borne flight, the apparatus comprising:
   a frame;
   a parking station supported by the frame and including at least one arm configured to engage a portion of the aircraft;
   two spaced-apart rails connected to and extending from the frame;
   a first plurality of spaced-apart teeth extending from a first one of the rails, each of the first plurality of spaced-apart teeth being movable toward and away from the parking station, at least two of the first plurality of spaced-apart teeth being positioned such that a fixture of the aircraft can be received therebetween; and
   a second plurality of spaced-apart teeth extending from a second one of the rails, each of the second plurality of spaced-apart teeth being movable toward and away from the parking station, at least two of the second plurality of spaced-apart teeth being positioned such that the fixture of the aircraft can be received therebetween.

* * * * *

UNITED STATES PATENT AND TRADEMARK OFFICE
CERTIFICATE OF CORRECTION

| | | |
|---|---|---|
| PATENT NO. | : 8,955,800 B2 | Page 1 of 1 |
| APPLICATION NO. | : 13/527177 | |
| DATED | : February 17, 2015 | |
| INVENTOR(S) | : Brian T. McGeer et al. | |

It is certified that error appears in the above-identified patent and that said Letters Patent is hereby corrected as shown below:

IN THE SPECIFICATION

Please add the following section after the section entitled "PRIORITY" and before the section entitled "BACKGROUND":

NOTICE OF GOVERNMENT RIGHTS

This invention was made with Government support under N68335-I1-C-0527 awarded by the Department of the Navy. The United States Government has certain rights in this invention.

Signed and Sealed this
Ninth Day of August, 2016

Michelle K. Lee
*Director of the United States Patent and Trademark Office*